United States Patent [19]

Klebl et al.

[11] Patent Number: 5,440,097
[45] Date of Patent: Aug. 8, 1995

[54] PROCESS FOR CONTROLLING THE WELDING CURRENT AS A FUNCTION OF WELDING SPEED IN ARC WELDING EQUIPMENT

[75] Inventors: Wolfram Klebl, Isernhagen; Jens Metz, Burgwedel, both of Germany

[73] Assignee: Kabelmetal electro GmbH, Hanover, Germany

[21] Appl. No.: 278,168

[22] Filed: May 19, 1994

Related U.S. Application Data

[63] Continuation of Ser. No. 62,777, May 17, 1993, abandoned.

[30] Foreign Application Priority Data

May 20, 1992 [DE] Germany .............. 42 16 594.6

[51] Int. Cl.⁶ .................................. B23K 9/095
[52] U.S. Cl. .................. 219/130.21; 219/61; 219/130.51
[58] Field of Search ........... 219/130.21, 130.51, 219/61, 137 PS

[56] References Cited

U.S. PATENT DOCUMENTS 3,261,960  7/1966  Lehnert ................... 219/130.21
3,286,074 11/1966  Lehnert et al. ........... 219/130.21
3,544,760 12/1970  Broodman .
3,619,554 11/1971  Klebl et al. ............. 219/130.21
3,626,146 12/1971  Smith et al. ............ 219/130.21
5,192,850  3/1993  Brünn et al. .

FOREIGN PATENT DOCUMENTS 0451464 10/1991  European Pat. Off. .
2240888  8/1991  United Kingdom .

OTHER PUBLICATIONS

Patent Abstracts of Japan, vol. 5, No. 050 (M-062) Apr. 9, 1981 & JP-A-56 004 377 (Daihen Corp.) Jan. 17, 1981.

*Primary Examiner*—Clifford C. Shaw
*Attorney, Agent, or Firm*—Ware, Fressola, Van Der Sluys & Adolphson

[57] ABSTRACT

A welding speed-dependent voltage (11) is added to a variable fixed voltage (13), to control the welding current as a function of welding speed in DC arc welding equipment, for the continuous welding of longitudinal seams of tube-shaped metal bands. In addition, the sum (15) of speed-dependent voltage (11) and variable fixed voltage (13) is superimposed by a pulsed DC voltage by a summing amplifier (28).

12 Claims, 2 Drawing Sheets

PROCESS FOR CONTROLLING THE WELDING CURRENT AS A FUNCTION OF WELDING SPEED IN ARC WELDING EQUIPMENT

This is a continuation of application Ser. No. 08/062,777 filed on May 17, 1993 now abandoned.

CROSS-REFERENCE TO RELATED APPLICATION

The present disclosure discloses subject matter which is also disclosed and which may be claimed in U.S. patent application Ser. No. 07/683,995, now U.S. Pat. No. 5,192,850.

1. Technical Field

The present invention concerns a process for controlling the welding current as a function of welding speed in DC arc welding equipment for continuous welding of longitudinal seams of tube-shaped metal bands, in which a welding speed-dependent voltage is added to a variable fixed voltage.

2. Background of the Invention

A circuit arrangement is already known (DE-OS 19 00 856), in which the electrodes of the welding equipment are influenced by a voltage source through a transformer, a welding current control and a speed-dependent tacho-generator. It contains means to control the welding current magnitude as a function of supply voltage, electrode spacing and temperature variations. Such a DC welding control circuit constantly measures the actual value of the welding current and influences the control by means of disturbance-variable compensation for even the slightest variations, so that the welding current magnitude always corresponds to the requirements in each case. The control may be short-term, so that the fluctuations of the supply voltage, the electrode spacing or even temperature variations are not noticed with respect to the welding current, rather that the welding current magnitude is always at the value required to weld the respective welding seam.

Difficulties arise when greater production speeds are required and different metals or band thicknesses are being used. The existing control is then no longer able to provide perfect welding seams.

To proceed in that event, it was already provided in U.S. application Ser. No. 07/683,995, now U.S. Pat. No. 5,192,850, which issued after the priority date hereof, to add a speed-dependent voltage to a variable fixed voltage. The descriptions of the embodiments shown in FIGS. 1-5 thereof at column 3, line 41 through column 5, line 39 are hereby incorporated by reference for indicating the background of the invention. The setting of a fixed voltage, perhaps as a function of the selected band thickness, causes a zero shift in the current-speed diagram, while the addition of the speed-dependent voltage leads to the welding current curve beginning at the respective zero point. This measure makes it possible to select any current value as a function of welding speed; although adaptation to any welding condition is possible, this process, however, cannot be used in all cases in which, particularly lately, pulsed welding current is used for continuous welding to reduce the effect of heat on the materials to be welded, especially in the molten metal area.

DISCLOSURE OF THE INVENTION

An object of the invention is to improve on the known process. According to the invention, a pulsed DC voltage is superimposed on the sum of the speed-dependent voltage and the variable fixed voltage. This ensures that the welding current is controllable as a function of production speed in such a way, that any metal and metal bands of different thicknesses can be perfectly welded while applying the smallest amount of heat possible.

To carry out the invention, the pulsed DC voltage is formed by adding a variable fixed voltage and a welding speed-dependent voltage, whose frequency and amplitude depend on the welding speed as well. This measure makes adaptation to any operating conditions possible, longitudinal weld seams can be performed without any problems. In this connection, it is especially advantageous if the variable fixed voltage serves as the basic frequency or basic amplitude, while the welding speed-dependent voltage is used to change the basic frequency and/or basic amplitude.

A circuit arrangement, in which the welding electrodes are supplied by a voltage source through a transformer, a control for adjusting the welding current and rectifier elements, proved to be useful for carrying out the process of the invention, where the control is influenced by a welding speed-dependent tacho-generator, which is connected to a control mechanism. In this configuration, the outputs of the tacho-generator and a fixed voltage source are connected separately to the inputs of a summing amplifier, whose output influences the input of the welding current control, while another input of this control is connected to the DC current transformer. This arrangement prevents any immediate reciprocal effect when the two voltage values are added; clear electrical ratios are produced. The output voltage of the summing amplifier is routed to the input of a welding current control, while the other input of this control is supplied by the transformer with the actual welding current. In this connection, it is essential for the invention that the cited summing amplifier is followed by a second summing amplifier, whose second input is supplied by a voltage/frequency converter, whose inputs are connected to two further summing amplifiers having tacho-generators and fixed voltage sources connected to their inputs. A corresponding number of tacho-generators can be used to produce all welding speed-dependent voltages; however, especially with a view towards circuit simplification, it is of particular advantage if a single tacho-generator is used to produce all the welding speed-dependent voltages.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
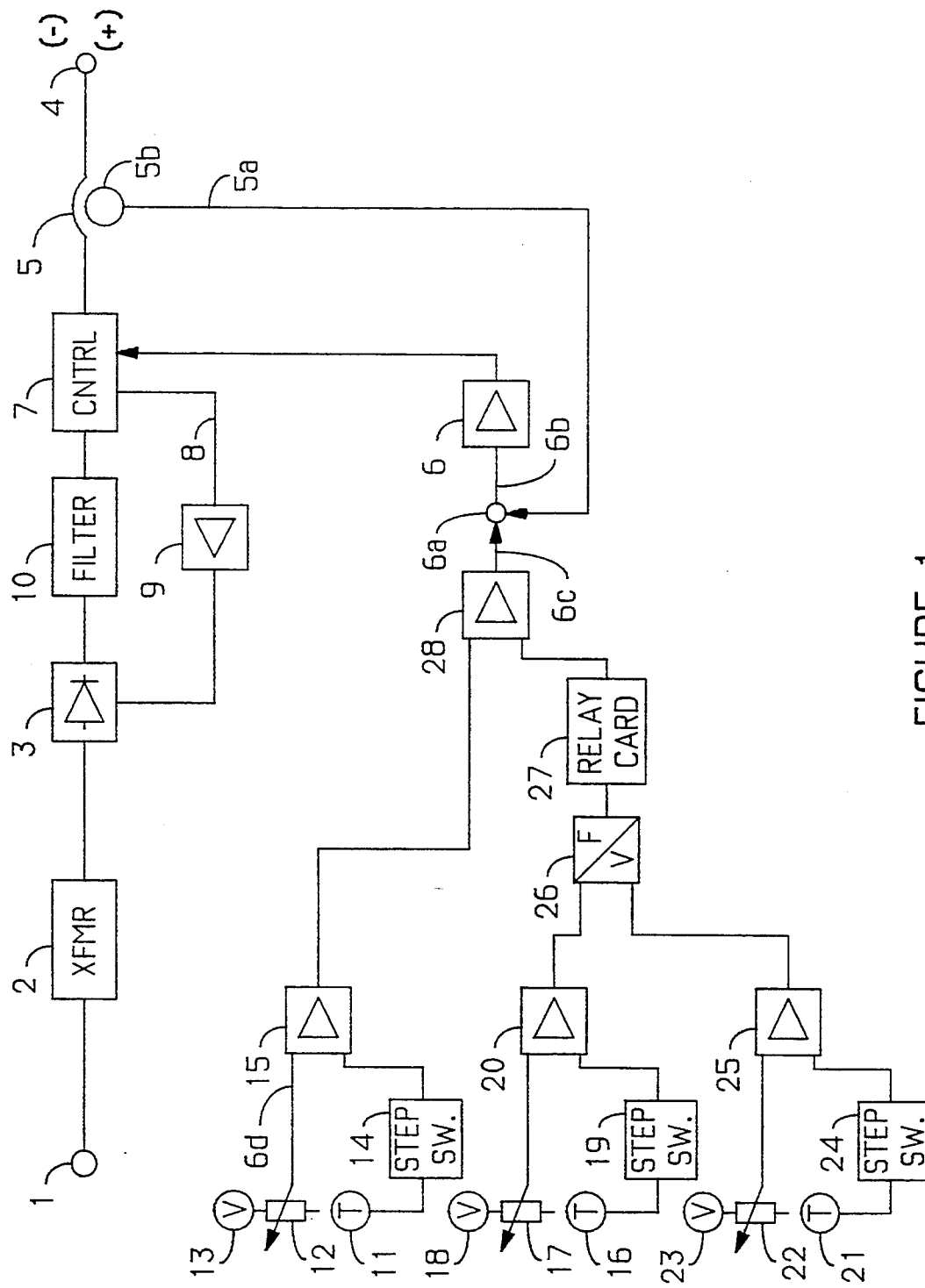
FIG. 1 is an illustration of a control, according to the present invention.

As can be seen in FIG. 1, a supply voltage 1, which may be a 50 or 60 Hz AC network, for example, is connected to a transformer 2. A thyristor 3 is energized by the secondary side of the transformer 2. A DC current transformer 5 is connected between welding electrodes 4, indicated by (+) and (−), and a thyristor 3, a filter section 10 and a transistor control 7. A voltage on a line 5a that corresponds to the actual value of the welding current can be obtained from a secondary side 5b of the transformer 5 and supplied as the actual value to a summing junction 6a which provides a signal on a line 6b to a control 6.

According to the teachings of the present invention, control 6 is supplied with a voltage that corresponds to the specified value, which results from a variable fixed voltage and a speed-dependent voltage, where a pulsed DC voltage is superimposed on the sum of speed-dependent voltage and variable fixed voltage. To form the basis for achieving this, a tacho-generator 11 and a voltage source 13, which can be adjusted by variable resistor 12, are provided. This sort of an arrangement was disclosed in the above-referenced patent. A step switch 14 may be connected between the tacho-generator 11 and a summing amplifier 15 to adjust the level of the output of the tachometer generator to achieve a desired slope as explained below. The step switch 14 is similar in concept to the variable resistor 12 (which may be continuously variable) except being variable in discrete steps. A total voltage value on a line 6c, obtained from the tacho-generator 11 and the fixed voltage source 13 with the help of the summing amplifier 15, is supplied to a summing amplifier 28, which is connected to the summing junction 6a which is in turn connected to control 6. The circuitry indicated by reference numerals 1–13 and 15 was disclosed in the above-referenced U.S. Pat. No. 5,192,850.

Figure 2:
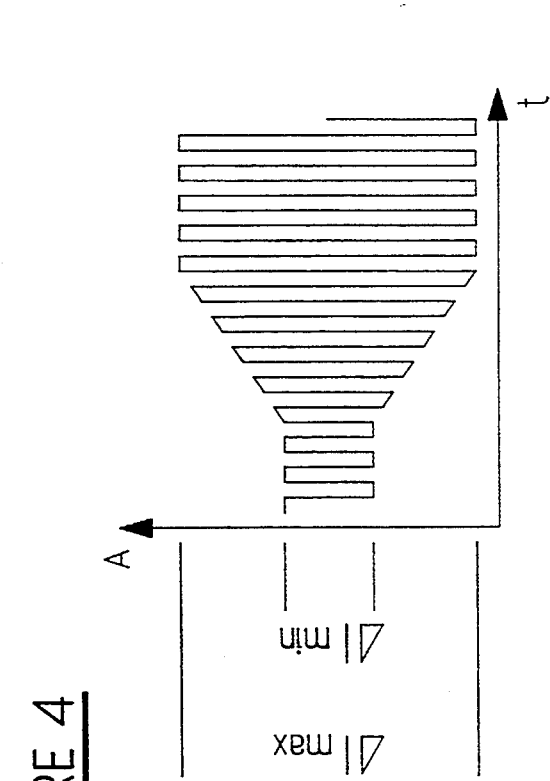
FIG. 2 shows a welding current produced, according to the present invention, as a function of production speed.

FIG. 2 depicts a welding current (A) on the ordinate produced in this way as a function of production speed on the abscissa. The parallel lines in this figure represent the basic portion of the welding current controlled by variable resistor 12, while the dashed lines reflect the possibilities resulting from the speed-dependent tacho-voltage. The welding current y-intercept and slope can be adjusted for different types of bands or band materials, as desired, by means of the variable resistor 12 and the step switch 14, respectively.

To control the speed-dependent welding current with a portion of DC current and superimposed pulse portion, it is important to make both the amplitude and the frequency of the pulsed portion of DC current a function of welding speed. As shown in FIG. 1, another tacho-generator 16 and a variable voltage source 18, which can be controlled by a variable resistor 17, are used for the purpose of making the amplitude of the pulsed portion a function of speed. Tacho-generator 16 is connected to a step switch 19 which is in turn connected to a summing amplifier 20. The fixed voltage source 18 is also connected to summing amplifier 20, which provides a summation of the voltage values delivered by both voltage sources 16, 18. Fixed voltage source 18 serves to adjust the basic amplitude, while the speed-dependent voltage of the tacho-generator 16 is used to adjust the speed-dependent amplitude.

To achieve a speed-dependent frequency of the pulsed and superimposed portion of DC current, a third fixed voltage source 23 is provided, whose voltage value can be controlled by variable resistor 22. A third tacho-generator 21 delivers a speed-dependent voltage through step switch 24, both voltage values are supplied to summing amplifier 25. In this instance, the voltage delivered by the fixed voltage source 23 serves to adjust the basic frequency, while the speed-dependent voltage of the tacho-generator 21 is used to produce a speed-dependent frequency. The frequency is produced by the voltage/frequency converter 26, to which the output voltages of summing amplifiers 20 and 25 are routed.

Figure 3:
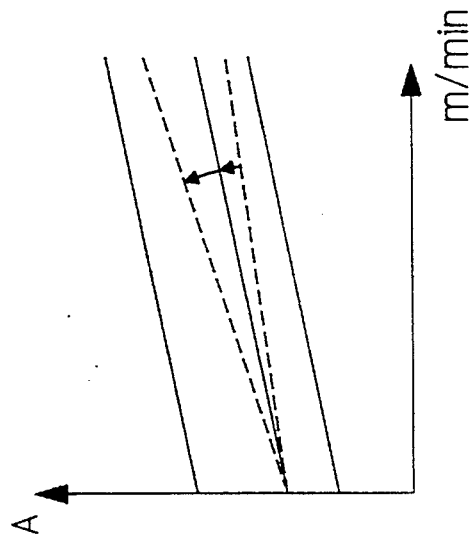
FIG. 3 illustrates a frequency change of welding current as a function of time, according to the present invention.
Figure 4:
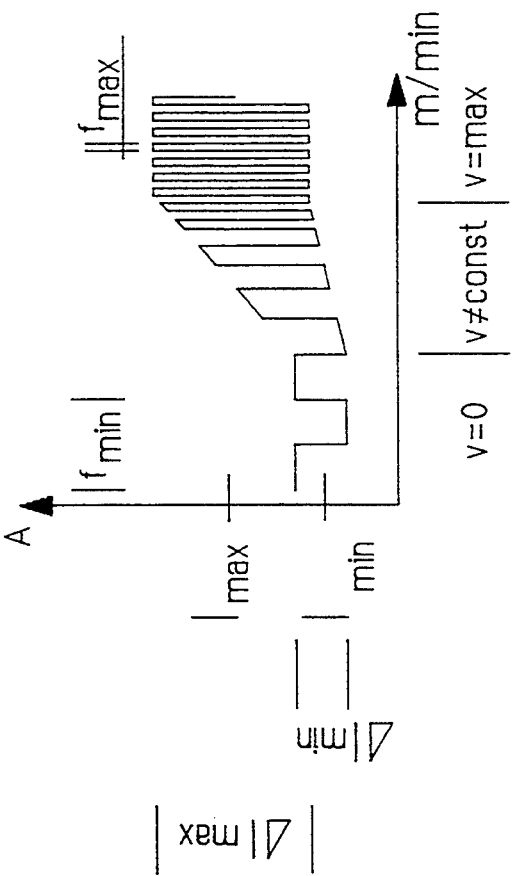
FIG. 4 shows speed-dependent amplitude change as a function of welding current over time, according to the present invention.

Details of these measures are shown in FIGS. 3 and 4, where FIG. 3 illustrates the frequency change of the welding current as a function of time, while FIG. 4 depicts the speed-dependent amplitude change as a function of welding current over time.

Figure 5:
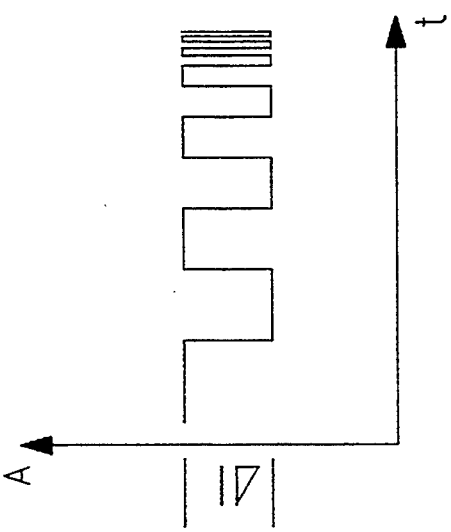
FIG. 5 shows superimposition in the form of a welding current which is a function of welding speed, according to the present invention.

The portion of DC current pulsed with the speed-dependent amplitude and speed-dependent frequency is supplied to summing amplifier 28 through a relay card 27, where it is superimposed on the variable fixed voltage and speed-dependent voltage from the fixed voltage source 13, or the tacho-generator 11, and is finally supplied to control 6. Card 27 is simply a relay that has a contact wired in the line between the converter 26 and the amplifier 28. It may be controlled externally to insert or remove the functions of the present invention from the subject matter disclosed in the above-referenced U.S. Pat. No. 5, 192,850, i.e., the circuitry indicated by reference numerals 1–13 and 15 of FIG. 1. FIG. 5 shows this superimposition in the form of a welding current which is a function of welding speed, consisting of a portion of DC current and a superimposed pulsed portion.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A process for controlling the welding current as a function of welding speed in DC arc welding equipment, for the continuous welding of longitudinal seams of tube-shaped metal bands, comprising the steps of
    adding a welding speed-dependent voltage to a variable fixed voltage,
    providing a control voltage by superimposing a pulsed DC voltage on the sum of the speed-dependent voltage and variable fixed voltage, and
    controlling the welding current in accordance with said control voltage.

2. A process as in claim 1, wherein the pulsed DC voltage is formed by adding a variable fixed voltage and a welding speed-dependent voltage, whose frequency and amplitude are equally a function of welding speed.

3. A process as in claim 2, wherein the variable fixed voltage serves to adjust a basic frequency or it basic amplitude of the pulsed DC voltage, while the welding speed-dependent voltage is used to change the basic frequency or the basic amplitude.

4. A process as claimed in claims 2, wherein the variable fixed voltage serves to adjust a basic frequency of the pulsed DC voltage, while the welding speed-dependent voltage is used to change the basic frequency of the pulsed DC voltage.

5. A process as claimed in claims 4, wherein the variable fixed voltage further serves to adjust a basic amplitude of the pulsed DC voltage, while the welding speed-dependent voltage is further used to change the basic amplitude of the pulsed DC voltage.

6. A process as claimed in claims 2, wherein the variable fixed voltage serves to adjust a basic amplitude of the pulsed DC voltage, while the welding speed-dependent voltage is used to change the basic amplitude of the pulsed DC voltage.

7. A circuit arrangement for use in a welding system for continuous longitudinal-seam welding, comprising:
 a welding device having an adjustable output power, said device being connectable to a power source;
 a controller having an output connected to said welding device for controlling the power output from the welding device;
 an adjustable fixed voltage source for providing a variable fixed voltage;
 a welding-speed-dependent tacho-generator for providing a speed-dependent voltage in accordance with the welding speed along the longitudinal seam,
 means for providing a pulsed DC voltage; and
 wherein said controller is responsive to said variable fixed voltage, said speed-dependent voltage, and said pulsed DC voltage for superimposing said pulsed DC voltage on the sum of said variable fixed voltage and said speed-dependent for controlling the output power of the welding device.

8. A circuit arrangement as claimed in claim 7, wherein said means for providing a pulsed DC voltage comprises:
 a second adjustable fixed voltage source for providing a second variable fixed voltage for adjusting a basic amplitude of said pulsed DC voltage;
 a second welding-speed-dependent tacho-generator for providing a second speed-dependent voltage for adjusting a speed dependent amplitude of said pulsed DC voltage;
 a first summation amplifier for summing said second variable fixed voltage and said second speed-dependent voltage;
 a third adjustable fixed voltage source for providing a third variable fixed voltage for adjusting a basic frequency of said pulsed DC voltage;
 a third welding-speed-dependent tacho-generator for providing a third speed-dependent voltage for adjusting a speed dependent frequency of said pulsed DC voltage;
 a second summation amplifier for summing said third variable fixed voltage and said third speed-dependent voltage; and
 a voltage/frequency converter, whose inputs are connected to the outputs of said first and second summing amplifiers for providing said pulsed DC voltage at its output.

9. A circuit arrangement as in claim 8, wherein a single tachogenerator is used to correlate all the speed-dependent voltages.

10. A circuit arrangement as claimed in claim 8, wherein the welding device is a DC arc-welding system, including a transformer connected to said power source, welding electrodes connected to said transformer to be supplied from said power source, and a control element for adjusting and rectifying welding current, said control dement being controlled by the output of said controller.

11. A circuit as claimed in claim 8, additionally comprising:
 a third summation amplifier having inputs separately connected to the output of the tacho-generator and to the fixed voltage source; and
 a forth summation amplifier having inputs separately connected to the output of the third summation amplifier and the voltage/frequency converter, and providing an output to an input of said controller.

12. A circuit as claimed in claim 8, wherein the welding device is a DC arc-welding system including a transformer connected to the power source, welding electrodes connected to said transformer to be supplied from said power source, a thyristor/rectifier arrangement connected between the transformer and the welding electrodes, and a series-connected transistor unit disposed between said thyristor/rectifier arrangement and said electrodes, said series-connected transistor unit being controlled by said controller and providing an output to control the thyristor/rectifier arrangement.

* * * * *

UNITED STATES PATENT AND TRADEMARK OFFICE
CERTIFICATE OF CORRECTION

PATENT NO. : 5,440,097
DATED : August 8, 1995
INVENTOR(S) : Klebl et al.

It is certified that error appears in the above-indentified patent and that said Letters Patent is hereby corrected as shown below:

Claim 12, column 6, line 40 "DC are-welding"

should read -- DC arc-welding --

Signed and Sealed this

Twenty-sixth Day of December, 1995

Attest:

BRUCE LEHMAN

Attesting Officer     Commissioner of Patents and Trademarks